US012033844B2

(12) United States Patent
Hager

(10) Patent No.: US 12,033,844 B2
(45) Date of Patent: Jul. 9, 2024

(54) AUTO GAIN CONTROL FOR OPTIMUM ION TRAP FILLING

(71) Applicant: DH TECHNOLOGIES DEVELOPMENT PTE. LTD., Singapore (SG)

(72) Inventor: James W Hager, Mississauga (CA)

(73) Assignee: DH Technologies Development Pte. Ltd., Singapore (SG)

( * ) Notice: Subject to any disclaimer, the term of this patent is extended or adjusted under 35 U.S.C. 154(b) by 213 days.

(21) Appl. No.: 17/427,216

(22) PCT Filed: Jan. 28, 2020

(86) PCT No.: PCT/IB2020/050656
§ 371 (c)(1),
(2) Date: Jul. 30, 2021

(87) PCT Pub. No.: WO2020/157655
PCT Pub. Date: Aug. 6, 2020

(65) Prior Publication Data
US 2022/0102135 A1 Mar. 31, 2022

Related U.S. Application Data

(60) Provisional application No. 62/800,381, filed on Feb. 1, 2019.

(51) Int. Cl.
*H01J 49/00* (2006.01)
*H01J 49/42* (2006.01)

(52) U.S. Cl.
CPC ...... *H01J 49/4265* (2013.01); *H01J 49/0036* (2013.01); *H01J 49/4225* (2013.01)

(58) Field of Classification Search
CPC . H01J 49/4265; H01J 49/0036; H01J 49/4225
USPC .......................... 250/281, 282, 290, 292, 293
See application file for complete search history.

(56) References Cited

U.S. PATENT DOCUMENTS 6,627,876 B2 * 9/2003 Hager ................. H01J 49/4265 430/30
2003/0042415 A1 * 3/2003 Hager ................. H01J 49/4265 250/282
2003/0189168 A1 * 10/2003 Londry ............... H01J 49/4225 250/282

(Continued)

FOREIGN PATENT DOCUMENTS

WO 2018142265 A1 8/2018
WO WO-2018142265 A1 * 8/2018 .......... H01J 49/0031

OTHER PUBLICATIONS

International Search Report and Written Opinion for PCT/IB2020/050656 dated Apr. 8, 2020.

*Primary Examiner* — Michael Maskell
(74) *Attorney, Agent, or Firm* — Potomac Law Group, PLLC; Reza Mollaaghababa; Brian Hairston

(57) ABSTRACT

Methods and systems for loading an ion trap are provided herein in which the total ion beam intensity and/or content of the ion beam are quickly interrogated so as to determine an optimum fill time for an ion trap. In various aspects, the methods and systems described herein are effective to prevent overfilling of the ion trap while decreasing the time associated with known techniques utilized to obtain a survey scan of the ion beam.

20 Claims, 5 Drawing Sheets

(56) References Cited

U.S. PATENT DOCUMENTS

| | | | | |
|---|---|---|---|---|
| 2003/0189171 | A1* | 10/2003 | Londry | H01J 49/4225 250/282 |
| 2013/0068942 | A1* | 3/2013 | Verenchikov | H01J 49/062 250/282 |

* cited by examiner

AUTO GAIN CONTROL FOR OPTIMUM ION TRAP FILLING

RELATED APPLICATION

This application claims priority to U.S. provisional application No. 62/800,381 filed on Feb. 1, 2019, entitled "Auto Gain Control for Optimum Ion Trap Filling," which is incorporated herein by reference in its entirety.

FIELD

The present teachings are generally related to ion trap mass spectrometers and, more particularly, to methods and systems for determining optimum fill times in order to reduce space charge effects in such mass spectrometers.

BACKGROUND

Mass spectrometry (MS) is an analytical technique for determining the elemental composition of test substances with both quantitative and qualitative applications. For example, MS can be used to identify unknown compounds, to determine the isotopic composition of elements in a molecule, and to determine the structure of a particular compound by observing its fragmentation, as well as to quantify the amount of a particular compound in the sample.

In many MS applications, ion trapping is utilized to store and/or cool ions prior to performing further mass spectrometric analysis. Conventional configurations of ion traps include the kind described in U.S. Pat. No. 2,939,952, for example, which generally comprise a ring electrode and a pair of end cap electrodes. RF and DC voltages applied to the electrodes establish a three dimensional field which traps ions within a specified mass-to-charge range. Linear quadruples can also be configured as ion traps, with radial confinement provided by an applied RF voltage and axial confinement by DC barriers at the ends of the rod array. Mass selective detection of ions trapped within a linear ion trap (LIT) can be accomplished by ejecting the ions radially (e.g., as taught by U.S. Pat. No. 5,420,425) or via selective mass axial ejection (MSAE) (e.g., as taught by U.S. Pat. No. 6,177,668).

The performance of any ion trap is strongly influenced by the density of the trapped ions. In particular, when the ion density increases above a particular limit, poor mass spectral peak quality, mass assignment accuracy, and loss of ion intensities can result. In extreme cases, mass spectral peaks can be completely smeared out such that little useful information is obtained. While various techniques are known for preventing overfilling ion traps (see e.g., U.S. Pat. Nos. 5,572,022, 6,627,876, and 8,344,316), such techniques can increase analysis time due to the need to trap/cool ions in a pre-analytical run and/or by performing a survey scan in which a mass analyzer must sequentially transmits ions over a range of m/z values to determine the total intensity of the ion beam.

Accordingly, there is a need for rapid determination of the ion current provided by an ion source so that the number of ions injected into an ion trap can be adjusted to provide for optimal MS performance.

SUMMARY

In accordance with various aspects of the present teachings, improved methods and systems for loading an ion trap are provided in which the total ion beam intensity and/or content of the ion beam are quickly interrogated so as to determine an optimum fill time for the ion trap. For example, in certain aspects, a method of performing mass analysis in a mass spectrometer system including an ion trap is provided, the method comprising passing an ion beam comprising a plurality of ions through a quadrupole assembly having a quadrupole rod set extending from an input end for receiving the ions to an output end through which ions exit the quadrupole rod set. At least one RF voltage is applied to each of the rods of the quadrupole rod set so as to generate a field for radial confinement of the ions as they pass therethrough, and, while applying the RF voltage to each of the rods, a voltage pulse is applied across the quadrupole assembly so as to excite radial oscillations of at least a portion of the ions at secular frequencies thereof. Fringing fields in proximity to the output end convert the radial oscillations of at least a portion of the excited ions into axial oscillations as the excited ions exit the quadrupole rod set and at least a portion of the axially oscillating ions exiting the quadrupole rod set are detected to generate a time-varying signal. A Fourier transform of the time-varying signal is obtained so as to generate a frequency-domain signal containing information of the ion beam composition, and a fill time of the ion trap is determined based on the ion beam composition information. Thereafter, in certain aspects, the ion trap can be filled for the determined fill time while operating the ion trap in trapping mode and the analytical spectrum from ions trapped in the ion trap can be determined. In certain aspects, the step of passing an ion beam through the quadrupole assembly is performed without trapping the ions therein, thereby reducing the time required to produce a scan relative to known techniques which require trapping/cooling the ions of the interrogated beam prior to determining the intensity or composition of the ion beam.

The quadrupole assembly can have a variety of configurations in accordance with the present teachings. For example, in some aspects the quadrupole rod set of the quadrupole assembly comprises a first pair of rods and a second pair of rods extending along a central longitudinal axis from the input end to the output end, wherein the rods are spaced apart from the central longitudinal axis such that the rods of each pair are disposed on opposed sides of the central longitudinal axis. In certain aspects, the voltage pulse is applied across the quadrupole assembly by applying a voltage pulse across the rods of one of the first and second pairs of the quadrupole rod set. Alternatively, in some aspects, the voltage pulse is applied across the quadrupole assembly by applying a voltage pulse to auxiliary electrodes interposed between the rods of the quadrupole rod set. For example, in certain embodiments, the quadrupole assembly further comprises a pair of auxiliary electrodes extending along the central longitudinal axis on opposed sides thereof, wherein each of the auxiliary electrodes is interposed between a single rod of the first pair of rods and a single rod of the second pair of rods, and wherein applying the voltage pulse across the quadrupole assembly comprises applying the voltage pulse across the auxiliary electrodes.

In various aspects, the ion beam composition information includes at least one of intensity of the ion beam and intensity of one or more ions of a particular m/z therein. In related aspects, the fill time of the ion trap is determined based on the total ion beam intensity. Additionally or alternatively, the fill time of the ion trap is determined based on the intensity of one or more ions of the particular m/z, and the ion trap can be preferentially filled for the fill time with the ions of the particular m/z. For example, a mass analyzer disposed between the ion source and the ion trap can be configured to prevent transmission of ions in the ion beam that are not the ions of interest of the particular m/z.

In accordance with various aspects of the present teachings, a mass spectrometer system is provided comprising an ion source for generating an ion beam comprising a plurality of ions, an ion trap, and a quadrupole assembly having a quadrupole rod set extending from an input end for receiving the ions to an output end through which ions exit the quadrupole rod set. One or more power sources are configured to provide i) at least one RF voltage to each of the rods of the quadrupole rod set so as to generate a field for radial confinement of the ions as they pass therethrough, and ii) a voltage pulse across the quadrupole assembly so as to excite radial oscillations of at least a portion of the ions at secular frequencies thereof, wherein fringing fields in proximity to the output end convert said radial oscillations of at least a portion of the excited ions into axial oscillations as the excited ions exit the quadrupole rod set. The system also includes a detector for detecting at least a portion of the axially oscillating ions exiting the quadrupole rod set so as to generate a time-varying signal. A controller, comprising an analysis module, is configured to obtain a Fourier transform of the time-varying signal so as to generate a frequency-domain signal containing information of the ion beam composition and determine a fill time of the ion trap based on said ion beam composition information. In various aspects, the one or more power sources can be further configured to provide RF and/or DC signals to the ion trap under the control of the controller so as to fill the ion trap for the determined fill time. Additionally, in certain aspects, the analysis module is operable to determine the analytical spectrum resulting from the ions trapped in the ion trap. In various aspects, the controller can also be operable to automatically adjust the fill time such that the number of ions trapped in the ion trap does not exceed a pre-selected threshold (e.g., about 10,000 ions).

The voltage pulse can have a variety of amplitudes and durations in accordance with the present teachings. By way of example, the voltage pulse can have a duration in a range of about 10 nanoseconds (ns) to about 1 millisecond, e.g., in a range of about 1 microsecond to about 100 microseconds, or in a range of about 1 microsecond to about 5 microseconds. Further, the voltage pulse can have an amplitude, for example, in a range of about 5 volts to about 40 volts, e.g., in a range of about 20 volts to 30 volts.

Further understanding of various aspects of the present teachings can be obtained by reference to the following detailed description in conjunction with the associated drawings, which are described briefly below.

DETAILED DESCRIPTION

Figure 1:
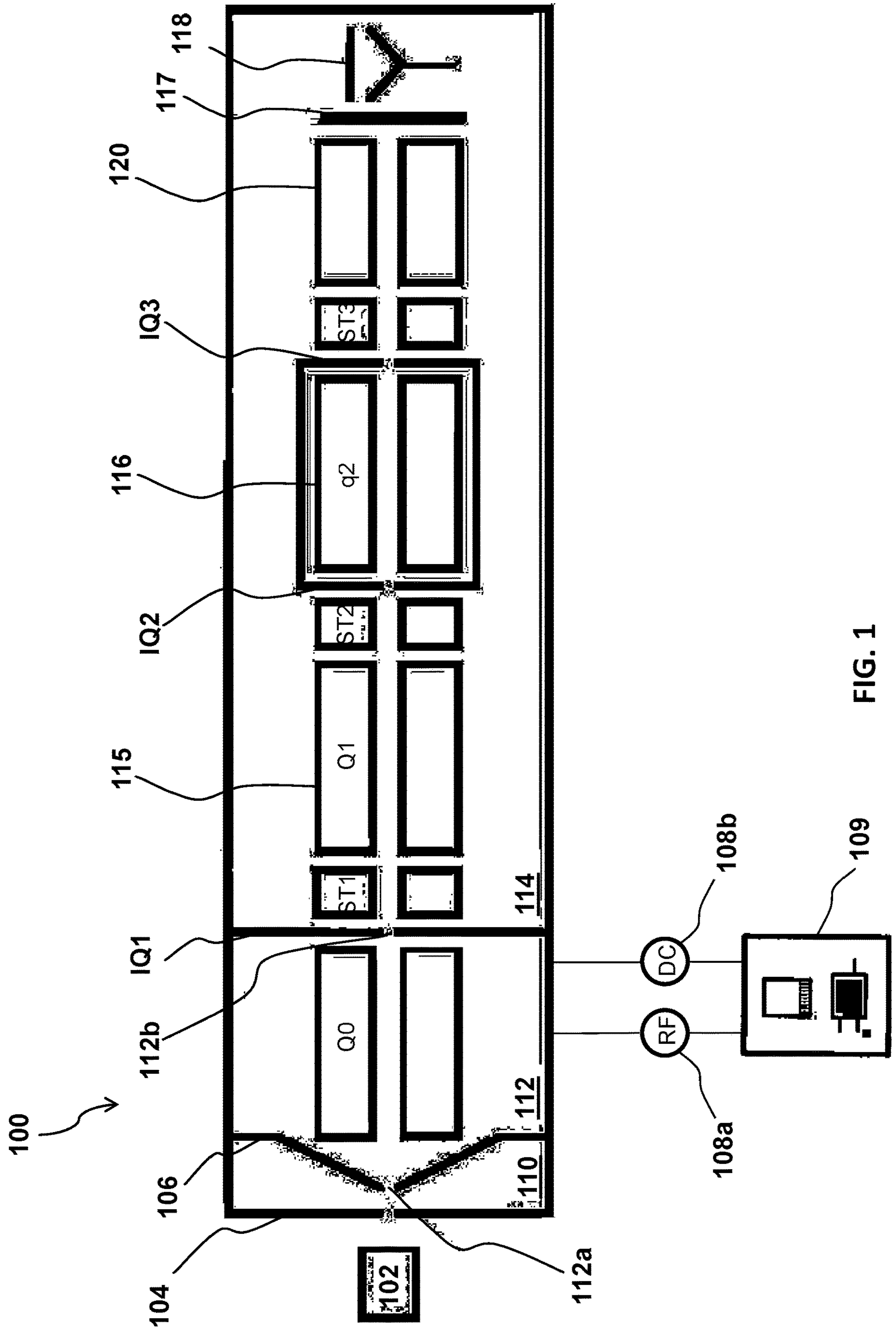
FIG. 1 schematically depicts an exemplary mass spectrometer system in accordance with various aspects of applicant's teachings.

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly, it will be apparent that the described embodiments may be susceptible to alteration or variation according to common general knowledge without departing from the scope of the disclosure. The following detailed description of embodiments is not to be regarded as limiting the scope of the applicant's teachings in any manner. As used herein, the terms "about" and "substantially equal" refer to variations in a numerical quantity that can occur, for example, through measuring or handling procedures in the real world; through inadvertent error in these procedures; through differences in the manufacture, source, or purity of compositions or reagents; and the like. Typically, the terms "about" and "substantially" as used herein means greater or lesser than the value or range of values stated by 1/10 of the stated values, e.g., ±10%. For instance, a concentration value of about 30% or substantially equal to 30% can mean a concentration between 27% and 33%. The terms also refer to variations that would be recognized by one skilled in the art as being equivalent so long as such variations do not encompass known values practiced by the prior art.

Methods and systems for loading an ion trap are provided herein in which the total ion beam intensity and/or content of the ion beam are quickly interrogated so as to determine an optimum fill time for an ion trap. In various aspects, the methods and systems described herein are effective to prevent overfilling of the ion trap while decreasing the time associated with known techniques utilized to obtain a survey scan of the ion beam. Systems in accordance with the present teachings generally include a quadrupole assembly comprising a quadrupole rod set, and optionally a plurality of auxiliary electrodes, configured such that the application of a voltage pulse to rods of the quadrupole assembly causes a radial excitation of at least a portion of the ions in an ion beam continuously passing through the assembly (i.e., without trapping). The interaction of the radially excited ions with the fringing fields in the vicinity of the output end of the quadrupole rod set can convert the radial oscillations into axial oscillations that are detected by a detector so as to generate a time-varying signal. The signal is then transformed into the frequency-domain so as to provide a mass spectrum of the ion beam based on the relationship between the ions' m/z and their secular frequencies, with this information being utilized to set an optimum fill time for trapping the ions of the ion beam within an ion trap. In this manner, the total ion current (ion beam intensity) and the beam's composition is quickly determined from the broadband excitation voltage pulse, which has a short duration relative to conventional techniques that require sequentially scanning voltages to interrogate the entire ion beam across its range of m/z.

While systems, devices, and methods described herein can be used in conjunction with many different mass spectrometry systems, an exemplary mass spectrometry system 100 for use in accordance with the present teachings is illustrated schematically in FIG. 1. It should be understood that mass spectrometry system 100 represents only one possible configuration and that other mass spectrometry systems modified in accordance with the present teachings can also be used as well. As shown schematically in the exemplary embodiment depicted in FIG. 1, the mass spectrometry system 100 generally includes an ion source 104 for generating ions within an ionization chamber 110, a collision focusing ion guide Q0 housed within a first vacuum chamber 112, and a downstream vacuum chamber 114 containing one or more mass analyzers, one of which is a quadrupole assembly 120 in accordance with the present teachings as discussed below. Though the exemplary second vacuum chamber 114 is depicted as housing three quadrupoles (i.e., elongated rod sets mass filter 115 (also referred to as Q1), collision cell 116 (also referred to as q2), and quadrupole assembly 120), it will be appreciated that more or fewer mass analyzer or ion processing elements can be included in systems in accordance with the present teachings. Though mass filter 115 and collision cell 116 are generally referred to herein as quadrupoles (that is, they have four rods) for convenience, the elongated rod sets 115, 116 may be other suitable multipole configurations. For example, collision cell 116 can comprise a hexapole, octapole, etc. It will also be appreciated that the mass spectrometry system can comprise any of triple quadrupoles, linear ion traps, quadrupole time of flights, Orbitrap or other Fourier transform mass spectrometry systems, all by way of non-limiting examples.

Each of the various stages of the exemplary mass spectrometer system 100 will be discussed in additional detail with reference to FIG. 1. Initially, the ion source 102 is generally configured to generate ions from a sample to be analyzed and can comprise any known or hereafter developed ion source modified in accordance with the present teachings. Non-limiting examples of ion sources suitable for use with the present teachings include atmospheric pressure chemical ionization (APCI) sources, electrospray ionization (ESI) sources, continuous ion source, a pulsed ion source, an inductively coupled plasma (ICP) ion source, a matrix-assisted laser desorption/ionization (MALDI) ion source, a glow discharge ion source, an electron impact ion source, a chemical ionization source, or a photo-ionization ion source, among others.

Ions generated by the ion source 102 are initially drawn through an aperture in a sampling orifice plate 104. As shown, ions pass through an intermediate pressure chamber 110 located between the orifice plate 104 and the skimmer 106 (e.g., evacuated to a pressure approximately in the range of about 1 Torr to about 4 Torr by a mechanical pump (not shown)) and are then transmitted through an inlet orifice 112*a* to enter a collision focusing ion guide Q0 so as to generate a narrow and highly focused ion beam. In various embodiments, the ions can traverse one or more additional vacuum chambers and/or quadrupoles (e.g., a QJet® quadrupole or other RF ion guide) that utilize a combination of gas dynamics and radio frequency fields to enable the efficient transport of ions with larger diameter sampling orifices. The collision focusing ion guide Q0 generally includes a quadrupole rod set comprising four rods surrounding and parallel to the longitudinal axis along which the ions are transmitted. As is known in the art, the application of various RF and/or DC potentials to the components of the ion guide Q0 causes collisional cooling of the ions (e.g., in conjunction with the pressure of vacuum chamber 112), and the ion beam is then transmitted through the exit aperture in IQ1 (e.g., an orifice plate) into the downstream mass analyzers for further processing. The vacuum chamber 112, within which the ion guide Q0 is housed, can be associated with a pump (not shown, e.g., a turbomolecular pump) operable to evacuate the chamber to a pressure suitable to provide such collisional cooling. For example, the vacuum chamber 112 can be evacuated to a pressure approximately in the range of about 1 mTorr to about 30 mTorr, though other pressures can be used for this or for other purposes. For example, in some aspects, the vacuum chamber 112 can be maintained at a pressure such that pressure×length of the quadrupole rods is greater than $2.25\times10^{-2}$ Torr-cm. The lens IQ1 disposed between the vacuum chamber 112 of Q0 and the adjacent chamber 114 isolates the two chambers and includes an aperture 112*b* through which the ion beam is transmitted from Q0 into the downstream chamber 114 for further processing.

Vacuum chamber 114 can be evacuated to a pressure than can be maintained lower than that of ion guide chamber 112, for example, in a range from about $1\times10^{-6}$ Torr to about $1.5\times10^{-3}$ Torr. For example, the vacuum chamber 114 can be maintained at a pressure in a range of about $8\times10^{-5}$ Torr to about $1\times10^{-4}$ Torr (e.g., $5\times10^{-5}$ Torr to about $5\times10^{-4}$ Torr) due to the pumping provided by a turbomolecular pump and/or through the use of an external gas supply for controlling gas inlets and outlets (not shown), though other pressures can be used for this or for other purposes. The ions enter the quadrupole mass filter 115 via stubby rods ST1. As will be appreciated by a person of skill in the art, the quadrupole mass filter 115 can be operated as a conventional transmission RF/DC quadrupole mass filter that can be operated to select an ion of interest or a range of ions of interest. By way of example, the quadrupole mass filter 115 can be provided with RF/DC voltages suitable for operation in a mass-resolving mode. As should be appreciated, taking the physical and electrical properties of the rods of mass filter 115 into account, parameters for an applied RF and DC voltage can be selected so that the mass filter 115 establishes a transmission window of chosen m/z ratios, such that these ions can traverse the mass filter 115 largely unperturbed. Ions having m/z ratios falling outside the window, however, do not attain stable trajectories within the quadrupole and can be prevented from traversing the mass filter 115. It should be appreciated that this mode of operation is but one possible mode of operation for mass filter 115. By way of example, in some aspects, the mass filter 115 can be operated in a RF-only transmission mode in which a resolving DC voltage is not utilized such that substantially all ions of the ion beam pass through the mass filter 115 largely unperturbed (e.g., ions that are stable at and below Mathieu parameter q=0.908). Alternatively, the lens IQ2 between mass filter 115 and collision cell 116 can be maintained at a much higher offset potential than the rods of mass filter 115 such that the quadrupole mass filter 115 be operated as an ion trap. Moreover, as is known in the art, the potential applied to the entry lens IQ2 can be selectively lowered (e.g., mass selectively scanned) such that ions trapped in mass filter 115 can be accelerated into the collision cell 116, which could also be operated as an ion trap, for example.

Ions transmitted by the mass filter 115 can pass through post-filter stubby rods ST2 (e.g., a set of RF-only stubby rods but that improves transmission of ions exiting a quadrupole) and lens IQ2 into the quadrupole 116, which as shown can be disposed in a pressurized compartment and can be configured to operate as a collision cell at a pressure approximately in the range of from about 1 mTorr to about 30 mTorr, though other pressures can be used for this or for other purposes. A suitable collision gas (e.g., nitrogen, argon, helium, etc.) can be provided by way of a gas inlet (not shown) to thermalize and/or fragment ions in the ion beam. In some embodiments, application of suitable RF/DC voltages to the quadrupole 116 and entrance and exit lenses IQ2 and IQ3 can provide optional mass filtering and/or trapping. Similarly, the quadrupole 116 can also be operated in a RF-only transmission mode such that substantially all ions of the ion beam pass through the collision cell 116 largely unperturbed Ions that are transmitted by collision cell 116 pass into the adjacent quadrupole assembly 120, which as shown in FIG. 1 is bounded upstream by IQ3 and stubby rods ST3 and downstream by the exit lens 117. The quadrupole assembly 120 can be operated at a decreased operating pressure relative to that of collision cell 116, for example, at a pressure in a range from about $1\times10^{-6}$ Torr to about $1.5\times10^{-3}$ Torr (e.g., about $5\times10^{-5}$ Torr), though other pressures can be used for this or for other purposes. As discussed in detail below with reference to FIGS. 2A-B, the quadrupole assembly 120 includes a quadrupole rod set such that the application of RF voltages to the quadrupole rods (with or without a resolving DC voltage) can provide radial confinement of the ions as they pass through the quadrupole rod set. Moreover, as the ion beam is transmitted through the quadrupole assembly 120, the application of a DC voltage pulse across the quadrupole assembly 120 can cause radial excitation of at least a portion of the ions (and preferably all) such that the interaction of the radially excited ions with the fringing fields at the exit of the quadrupole rod set can convert the radial excitation into axial excitation and ejection from the quadrupole rod set through the exit lens 117 for detection by detector 118, thereby generating a time-varying ion signal. As discussed in further detail below, the system controller 120, in communication with the detector 118, can operate on the time-varying ion signal (e.g., via one or more processors) to derive a mass spectrum of the detected ions in order to determine the fill time for one or more of the various components of mass spectrometry system 100 being operated as an ion trap based on the ion beam composition. For example, whereas the mass filter 115, collision cell 116, and quadrupole assembly 120 can be operated in transmission mode or mass filter mode (i.e., without trapping ions) while determining optimal fill time based on the ion beam intensity in accordance with the present teachings, each of these components can be switched to operate as an ion trap (e.g., under the control of a system controller 109) following the interrogation of the continuous ion beam as otherwise discussed herein.

As shown, the exemplary mass spectrometry system 100 of FIG. 1 additionally includes one or more power sources 108*a,b* that can be controlled by a controller 109 so as to apply electric potentials with RF and/or DC components to the quadrupole rods, various lenses, and auxiliary electrodes so as to configure the elements of the mass spectrometry system 100 for various different modes of operation depending on the particular MS application. It will be appreciated that the controller 109 can also be linked to the various elements in order to provide joint control over the executed timing sequences. Accordingly, the controller 109 can be configured to provide control signals to the power source(s) supplying the various components in a coordinated fashion in order to control the mass spectrometry system 100 as otherwise discussed herein. By way of example, the controller 109 may include a processor for processing information, data storage for storing mass spectra data, and instructions to be executed. It will be appreciated that though controller 109 is depicted as a single component, one or more controllers (whether local or remote) may be configured to cause the mass spectrometer system 100 to operate in accordance with any of the methods described herein. Additionally, in some implementations, the controller 109 may be operatively associated with an output device such as a display (e.g., a cathode ray tube (CRT) or liquid crystal display (LCD) for displaying information to a computer user) and/or an input device including alphanumeric and other keys and/or cursor control for communicating information and command selections to the processor. Consistent with certain implementations of the present teachings, the controller 109 executes one or more sequences of one or more instructions contained in data storage, for example, or read into memory from another computer-readable medium, such as a storage device (e.g., a disk). The one or more controller(s) may take a hardware or software form, for example, the controller 109 may take the form of a suitably programmed computer, having a computer program stored therein that is executed to cause the mass spectrometer system 100 to operate as otherwise described herein, though implementations of the present teachings are not limited to any specific combination of hardware circuitry and software. Various software modules associated with the controller 109, for example, may execute programmable instructions to perform the exemplary methods described herein.

Figure 2B:
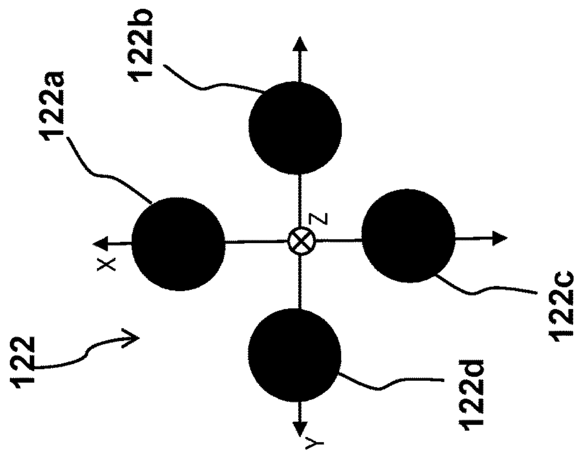
FIG. 2B schematically depicts a cross-section of the quadrupole assembly of FIG. 2A.
Figure 2C:
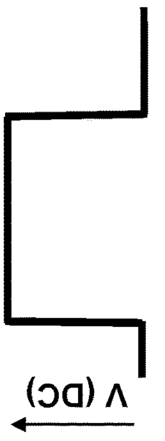
FIG. 2C schematically depicts a square voltage pulse suitable for use in some embodiments of a quadrupole assembly according to the present teachings.
Figure 2A:
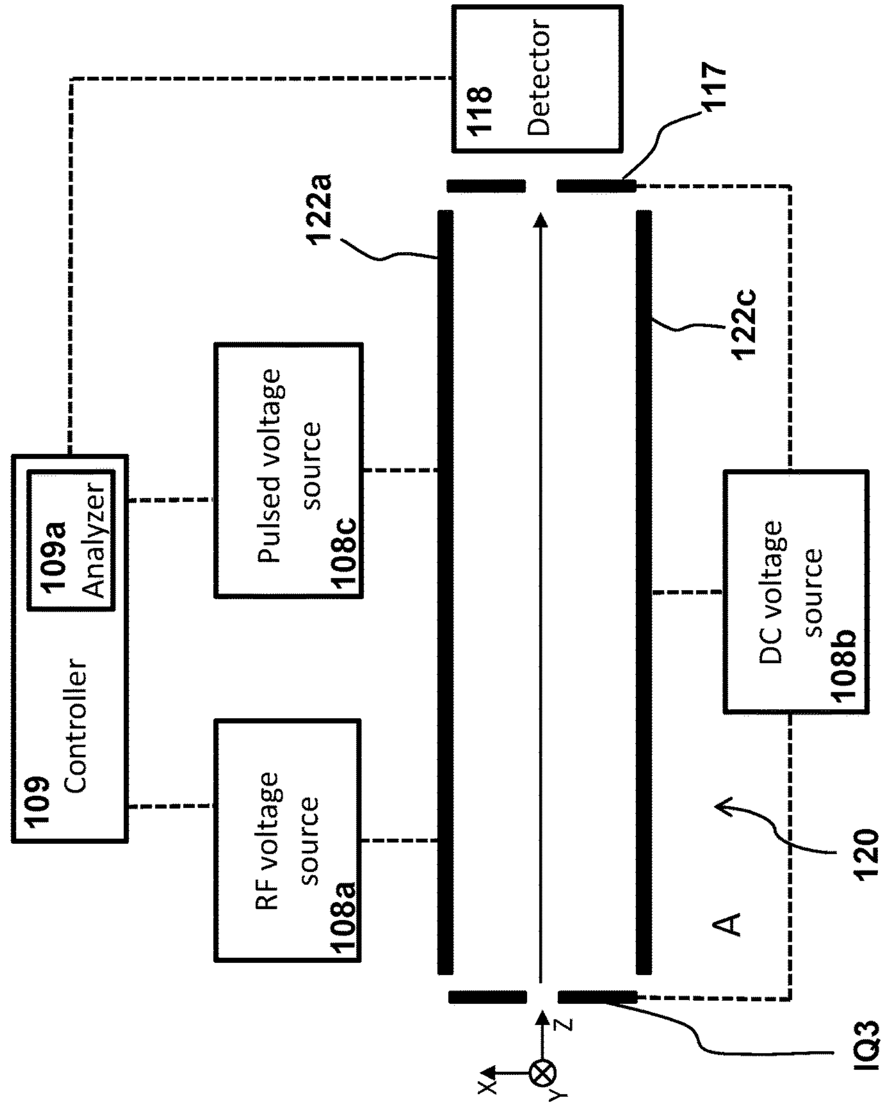
FIG. 2A schematically depicts an exemplary quadrupole assembly suitable for use in the system of FIG. 1 in accordance with various aspects of applicant's teachings.

With reference now to FIGS. 2A-B, quadrupole assembly 120 comprising a quadrupole rod set 122 in accordance with various aspects of the present teachings is depicted in additional detail. As shown, the quadrupole rod set 122 consists of four parallel rod electrodes 122*a-d* that are disposed around and parallel to a central longitudinal axis (Z) extending from an inlet end (e.g., toward the ion source 102) to an outlet end (e.g., toward detector 188). As best shown in cross-section in FIG. 2B, the rods 122*a-d* have a cylindrical shape (i.e., a circular cross-section) with the innermost surface of each rod 122*a-d* disposed equidistant from the central axis (Z) and with each of the rods 122*a-d* being equivalent in size and shape to one another. In particular, the rods 122*a-d* generally comprise two pairs of rods (e.g., a first pair comprising rods 122*a,c* disposed on the X-axis and a second pair comprising rods 122*b,d* disposed on the Y-axis), with rods of each pair being disposed on opposed sides of the central axis (Z) and to which identical electrical signals can be applied. The minimum distance between each of the rods 122*a-d* and the central axis (Z) is defined by a distance $r_0$ such that the innermost surface of each rod 122*a-d* is separated from the innermost surface of the other rod in its rod pair across the central longitudinal axis (Z) by a minimum distance of $2r_0$. It will be appreciated that though the rods 122*a-d* are depicted as cylindrical, the cross-sectional shape, size, and/or relative spacing of the rods 122*a-d* may be varied as is known in the art. For example, in some aspects, the rods 122*a-d* can exhibit a radially internal hyperbolic surface according to the equation $x^2-y^2=r_0^2$, where $r_0$ (the field radius) is the radius of an inscribed circle between the electrodes in order to generate quadrupole fields.

The rods 122*a-d* are electrically conductive (i.e., they can be made of any conductive material such as a metal or alloy) and can be coupled to one or more power supplies such that one or more electrical signals can be applied to each rod 122*a-d* alone or in combination. As is known in the art, the application of radiofrequency (RF) voltages to the rods 122*a-d* of the quadrupole rod set 122 can be effective to generate a quadrupolar field that radially confines the ions as they pass through the quadrupole rod set 122, with or without a selectable amount of a resolving DC voltage applied concurrently to one or more of the quadrupole rods. Generally as is known in the art, in order to produce a radially-confining quadrupolar field for at least a portion of the ions being transmitted through the quadrupole rod set 122, the power system can apply an electric potential to the first pair of rods 122*a,c* of a rod offset voltage (RO)+[U−V cos Ωt], where U is the magnitude of the resolving DC electrical signal provided by DC voltage source 108*b*, V is the zero-to-peak amplitude of the RF signal provided by RF voltage source 108*a*, Ω is the angular frequency of the RF signal, and t is time. The power system can also apply an electric potential to the second pair of rods 122*b,d* of RO−[U−Vcos Ωt] such that the electrical signals applied to the first pair of rods 122*a,c* and the second pair of rods 122*b,d* differ in the polarity of the resolving DC signal (i.e., the sign of U), while the RF portions of the electrical signals would be 180° out of phase with one another. It will be appreciated by a person skilled in the art that the quadrupole rod set 122 can thus be configured as a quadrupole mass filter that selectively transmits ions of a selected m/z range by a suitable choice of the DC/RF ratio. Alternatively, it will be appreciated that the quadrupole rod set 122 can be operated in a RF-only transmission mode in which a DC resolving voltage (U) is not applied such that ions entering the quadrupole rod set 122 that are stable at and below Mathieu parameter q=0.908 would be transmitted through the quadrupole rod set 122 without striking the rods 122*a-d*.

By way of non-limiting example, in some embodiments, the RF voltages applied to the quadrupole rods 122*a-d* can have a frequency in a range of about 0.8 MHz to about 3 MHz and an amplitude in a range of about 100 volts to about 1500 volts, though other frequencies and amplitudes can also be employed. Further, in some embodiments, the DC voltage source 108*b* can apply a resolving DC voltage to one or more of the quadrupole rods 122*a-d* so as to select ions within a desired m/z window. In some embodiments, such a resolving DC voltage can have an amplitude in a range of about 10 to about 150 V, for example.

As noted above, the application of the RF voltage(s) to the various rods 122*a-d* can result in the generation of a radially-confining quadrupolar field within the quadrupole assembly 120, but also characterized by fringing fields in the vicinity of the input and the output ends of the quadrupole rod set 122. By way of example, diminution of the quadrupole potential in the regions in proximity of the output of the quadrupole rod set 122 can result in the generation of fringing fields, which can exhibit a component along the longitudinal direction of the quadrupole (along the z-direction). In some embodiments, the amplitude of this electric field can increase as a function of increasing radial distance from the center of the quadrupole rod set 122. As discussed in more detail below, such fringing fields can be utilized in accordance with the present teachings to couple the radial and axial motions of ions within the quadrupole assembly 120.

By way of illustration and without being limited to any particular theory, the application of RF voltage(s) to the quadrupole rods 122*a-d* can result in the generation of a two-dimensional quadrupole potential as defined in the following relation:

$$\varphi_{2D} = \varphi_0 \frac{x^2 - y^2}{r_0^2} \qquad \text{Eq. (1)}$$

where, $\varphi_0$ represents the electric potential measured with respect to the ground, and x and y represent the Cartesian coordinates defining a plane perpendicular to the direction of the propagation of the ions (i.e., perpendicular to the z-direction). The electromagnetic field generated by the above potential can be calculated by obtaining a spatial gradient of the potential.

Again without being limited to any particular theory, to a first approximation, the potential associated with the fringing fields in the vicinity of the input and the output ends of the quadrupole rod set 122 may be characterized by the diminution of the two-dimensional quadrupole potential in the vicinity of the input and the output ends by a function $f(z)$ as indicated below:

$$\varphi_{FF} = \varphi_{2D} f(z) \qquad \text{Eq. (2)}$$

where, $\varphi_{FF}$ denotes the potential associated with the fringing fields and $\varphi_{2D}$ represents the two-dimensional quadrupole potential discussed above. The axial component of the fringing electric field ($E_{z,quad}$) due to diminution of the two-dimensional quadrupole field can be described as follows:

$$E_{z,quad} = -\varphi_{2D} \frac{\partial f(z)}{\partial z} \qquad \text{Eq. (3)}$$

Figure 4B:
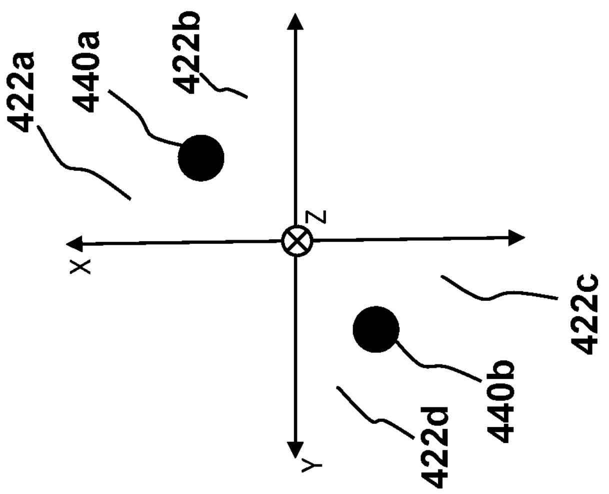
FIG. 4B schematically depicts a cross-section of the quadrupole assembly of FIG. 4A.
Figure 4A:
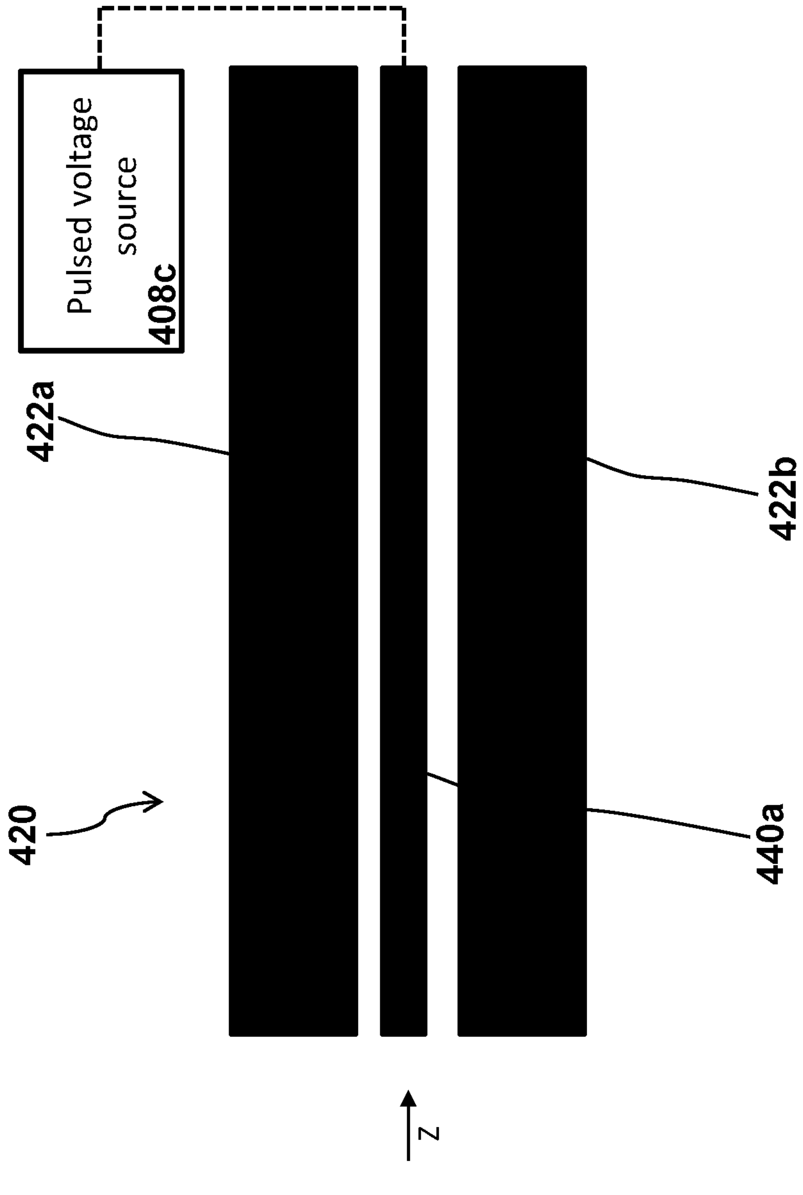
FIG. 4A schematically depicts another exemplary quadrupole assembly suitable for use in the system of FIG. 1 in accordance with various aspects of applicant's teachings.

As discussed in more detail below, such a fringing field allows the conversion of radial oscillations of ions that are excited via application of a voltage pulse to one or more of the quadrupole rods 122*a-d* (and/or one or more auxiliary electrodes as discussed below with reference to FIGS. 4A-B) to axial oscillations such that the axially oscillating ions can be detected by the detector 118.

With specific reference to FIGS. 1 and 2A, in this exemplary embodiment, the system 100 includes an input lens IQ3 disposed in proximity of the input end of the quadrupole rod set 122 (ST is omitted in FIG. 2A for clarity) and an output lens 117 disposed in proximity of the output end of the quadrupole rod set 122. A DC voltage source 108*b*, operating under the control of the controller 109, can apply two DC voltages to the input lens IQ3 and the output lens 117 (e.g., in range of about 1 to 50 V attractive relative to the DC offset applied to the quadrupole rods 122*a-d*). In some embodiments, the DC voltage applied to the input lens IQ3 causes the generation of an electric field that facilitates the entry of the ions into the quadrupole rod set 122. Further, the application of a DC voltage to the output lens 117 can facilitate the exit of the ions from the quadrupole rod set 122.

It will be appreciated that the lenses IQ3 and 117 can be implemented in a variety of different ways. For example, in some embodiments, the lenses can be in the form of a plate having an opening through which the ions pass. In other embodiments, at least one (or both) of the lenses can be implemented as a mesh. As noted above, there can also be RF-only Brubaker lenses ST at the entrance and exit ends of the quadrupole rod set 122.

With continued reference to FIG. 2A, the quadrupole assembly 120 can be coupled to a pulsed voltage source 108*c* for applying a voltage pulse to at least one of the quadrupole rods 122*a-d*. For example, the pulsed voltage source 108*c* can apply a dipolar pulsed voltage to the first pair of rods 122*a,c*, though in other embodiments, the dipolar pulsed voltage can instead be applied to the second pair of rods 122*b,d*. In general, a variety of pulse amplitudes and durations can be employed. In many embodiments, the longer the pulse width, the smaller the pulse amplitude that is utilized to generate the radial oscillations in accordance with the present teachings. In various embodiments, the amplitude of the applied voltage pulse can be, for example, in a range of about 5 volts to about 40 volts, or in a range of about 20 volts to about 30 volts, though other amplitudes can also be used. Further, the duration of the voltage pulse (pulse width) can be, for example, in a range of about 10 nanoseconds (ns) to about 1 millisecond, e.g., in a range of about 1 microsecond to about 100 microseconds, or in a range of about 1 microsecond to about 5 microseconds, though other pulse durations can also be used. Ions passing through the quadrupole are normally exposed to only a single excitation pulse. Once the "slug" of excited ions pass through the quadrupole rod set 122 as discussed below, an additional excitation pulse may be triggered. This can occur every 1 to 2 ms such that about 500 to 1000 data acquisition periods are collected each second.

The waveform associated with the voltage pulse can have a variety of different shapes with the goal of providing a rapid broadband excitation signal in accordance with the present teachings. By way of example, FIG. 2C schematically shows an exemplary voltage pulse having a square temporal shape. In some embodiments, the rise time of the voltage pulse, i.e., the time duration that it takes for the voltage pulse to increase from zero voltage to reach its maximum value, can be, for example, in a range of about 1 to 100 nsec. In other embodiments, the voltage pulse can have a different temporal shape.

Without being limited to any particular theory, the application of the voltage pulse (e.g., across two opposed quadrupole rods 122*a,c*) generates a transient electric field within the quadrupole assembly 120. The exposure of the ions within the quadrupole rod set 122 to this transient electric field can radially excite at least some of those ions at their secular frequencies. Such excitation can encompass ions having different mass-to-charge (m/z) ratios. In other words, the use of an excitation voltage pulse having a short temporal duration can provide a broadband radial excitation of the ions within the quadrupole rod set 122. As the radially excited ions reach the end portion of the quadrupole rod set 122 in the vicinity of the output end, they will interact with the exit fringing fields such that the radial oscillations of at least a portion of the excited ions can convert into axial oscillations, again without being limited to any particular theory.

Referring again to FIGS. 1 and 2A, axially-oscillating ions can thus exit the quadrupole rod set 122 via the exit lens 117 to reach the detector 118 such that the detector 118 generates a time-varying ion signal in response to the detection of the axially-oscillating ions. It will be appreciated that a variety of detectors known in the art and modified in accordance with the present teachings can be employed. Some examples of suitable detectors include, without limitation, Photonis Channeltron Model 4822C and ETP electron multiplier Model AF610.

As shown in FIG. 2A, an analysis module or analyzer 109*a* associated with the controller 109 can receive the detected time-varying signal from the detector 118 and operate on that signal to generate a mass spectrum associated with the detected ions. More specifically, in this embodiment, the analyzer 109*a* can obtain a Fourier transform of the detected time-varying signal to generate a frequency-domain signal. The analyzer can then convert the frequency domain signal into a mass spectrum using the relationships between the Mathieu parameters a and q and the ion's m/z.

$$a_x = -a_y = \frac{8zU}{\Omega^2 r_0^2 m} \quad \text{Eq. (4)}$$

$$q_x = -q_y = \frac{4zy}{\Omega^2 r_0^2 m} \quad \text{Eq. (5)}$$

where z is the charge on the ion, U is the resolving DC voltage on the rods, V is the RF voltage amplitude, Ω is the angular frequency of the RF, and $r_0$ is the characteristic dimension of the quadrupole. The radial coordinate r is given by the equation:

$$r^2 = x^2 + y^2 \quad \text{Eq. (6)}$$

In addition, when parameter q<~0.4, the parameter β is given by the equation:

$$\beta^2 = a + \frac{q^2}{2} \quad \text{Eq. (7)}$$

and the fundamental secular frequency is determined as follows:

$$\omega = \frac{\beta\Omega}{2} \quad \text{Eq. (8)}$$

Under the condition where parameter a=0 and parameter q<~0.4, the secular frequency is related to the particular ion's m/z by the approximate relationship below:

$$\frac{m}{z} \sim \frac{2}{\sqrt{2}} \frac{V}{\omega \Omega r_0^2} \quad \text{Eq. (9)}$$

The exact value of β is a continuing fraction expression in terms of the a and q Mathieu parameters. This continuing fraction expression can be found in the reference J. Mass Spectrom. Vol 32, 351-369 (1997), which is herein incorporated by reference in its entirety.

The relationship between m/z and secular frequency can alternatively be determined through fitting a set of frequencies to the equation:

$$\frac{m}{z} = \frac{A}{\omega} + B \quad \text{Eq. (10)}$$

where, A and B are constants to be determined.

With the time-varying signal generated by the detector 118 transformed, the generated frequency-domain signal thus contains information regarding the m/z distribution of ions within the ion beam that were excited at their secular frequency as a result of the application of the voltage pulse as discussed above. Such information can be presented in a plot, for example, known as a "mass spectra" that depicts the signal intensity at each m/z (indicative of the number of ions of that particular m/z that were sufficiently excited so as to enable detection), the integration of which indicates the ion beam intensity or total ion current (indicative of the total number of ions of various m/z that were sufficiently excited so as to enable detection).

As the total ion current increases, the time required to fill an ion trap with the ions from such a beam would decrease. Similarly, as the population of ions of a particular m/z (or a range of m/z) within an ion beam increases, the time required to reach capacity of an ion trap downstream of a mass filter (e.g., mass filter 115 of FIG. 1) operating to transmit only that m/z or range of m/z would also decrease. Accordingly, with knowledge of the ion beam composition as discussed above, systems and methods provided herein can automatically determine the fill time for an ion trap so as to avoid detrimental space charge effects that can result from overfilling. By way of non-limiting example, a controller in accordance with the present teachings may determine the fill time on the basis of the total number of ions of various m/z that are detected as a result of each voltage pulse (or from a series of voltage pulses) of known duration.

Though the capacity of known and/or commercially-available ion traps may vary, it will be appreciated in light of the present teachings that such ion traps may be of standard dimensions and may be operated under standard trapping conditions such that a typical maximum ion capacity (or total charge capacity) may also be known. It will also be appreciated by skilled artisans that the maximum ion capacity (or total charge capacity) may be empirically-derived for a particular instrument and/or experiment. By setting this maximum ion capacity or charge capacity as a threshold, for example, the maximum appropriate fill time can be calculated in light of the calculated flux of the ion beam during the duration of each voltage pulse. Likewise, a maximum appropriate fill time can be calculated for an ion of each m/z or range of m/z in light of the particular beam composition. Finally, if the number of charges on the ions of each m/z or range of m/z are also known, a maximum appropriate fill time can also be set by taking into account the number of charges entering the trap based on the known distribution of the ions of various charges in the ion beam.

Finally, upon determining an optimum fill time based on the ion beam composition in accordance with the present teachings, ion traps can be operated under the influence of the controller 109 to not exceed a maximum fill time. By way of non-limiting example, if it is known that degradation of performance of a particular ion trap occurs at a trap capacity of 10,000 ions and the total ion current of the ion beam as determined from sampling with a series of 5-microsecond pulses applied to the quadrupole assembly is determined to be $5 \times 10^8$ counts/sec (cps) (corresponding to an average of 2500 ions detected for each 5-microsecond pulse), the appropriate fill time based on the measured ion beam intensity would be less than 20 microseconds and control signals sent to the ion trap would indicate accordingly. After filling the trap, the substantially optimum number of sample ions contained therein can be mass analyzed (e.g., subject to MSAE, fragmentation, detection, etc.) as is known in the art.

In some embodiments, a quadrupole assembly according to the present teachings can be employed to generate mass spectra with a resolution that depends on the length of the time-varying excited ion signal, but the resolution can be typically in a range of about 100 to about 1000.

Figure 3:
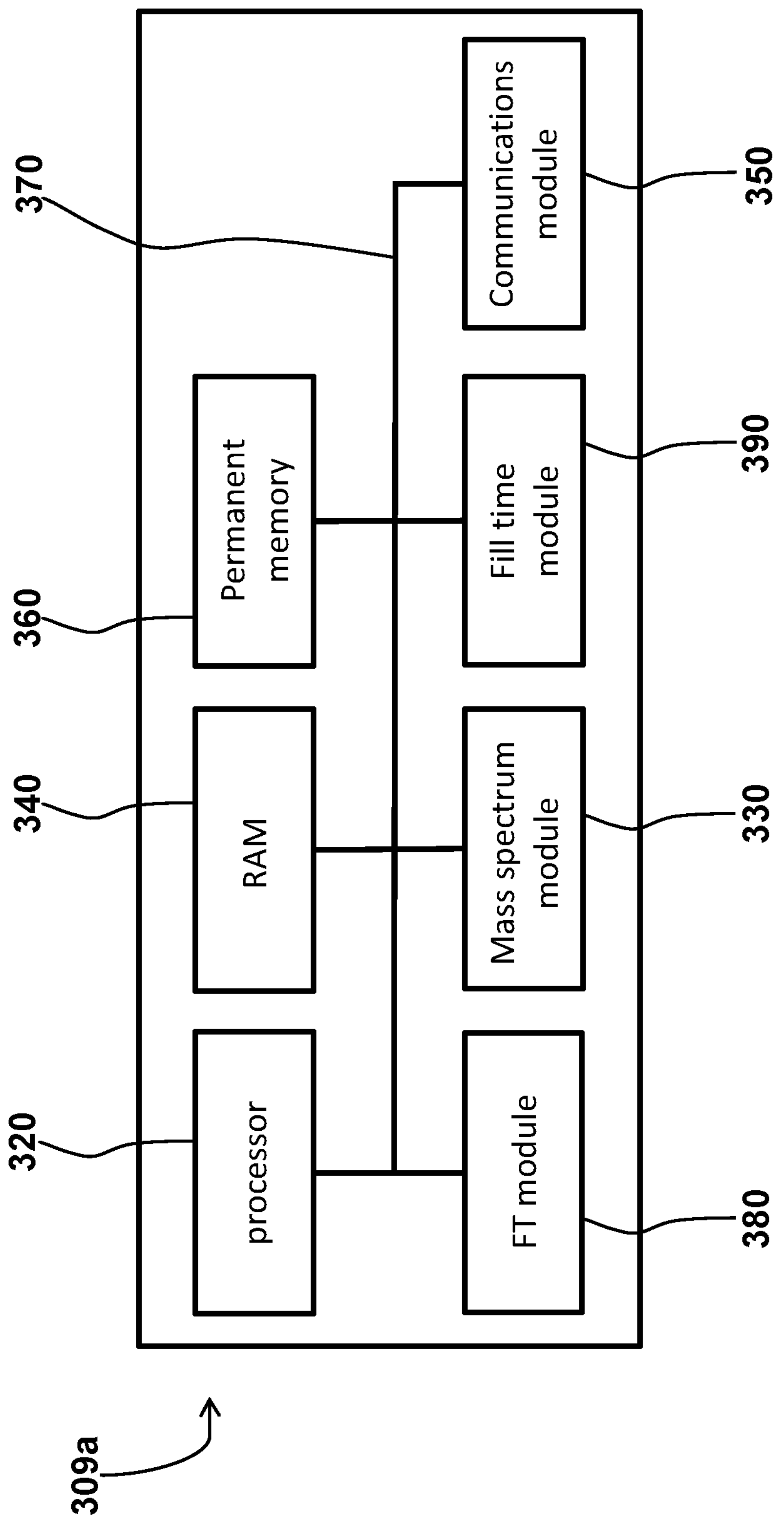
FIG. 3 schematically depicts an exemplary implementation of a controller suitable for use with a quadrupole assembly for calculating fill times of an ion trap in accordance with various aspects of applicant's teachings.

The controller 109 can be implemented in hardware and/or software in a variety of different ways. By way of example, FIG. 3 schematically depicts an embodiment of a controller 309, which includes a processor 320 for controlling the operation of its various modules utilized to perform analysis in accordance with the present teachings. As shown, the controller 309 includes a random-access memory (RAM) 340 and a permanent memory 360 for storing instructions and data. The controller 309 also includes a Fourier transform (FT) module 380 for transforming the time-varying ion signal received from the detector 118 (e.g., via Fourier transform) into a frequency domain signal, and a mass spectrum module 330 for calculating the mass spectrum of the detected ions based on the frequency domain signal. A fill time module 390 is utilized to determine the fill time on the basis of the ion beam composition information. A communications module 350 allows the controller 309 to communicate with the detector 118, e.g., to receive the detected ion signal, and an ion trap and/or power supplies so as to adjust trapping time in accordance with the determined fill time. A communications bus 370 allows various components of the controller 309 to communicate with one another.

In some embodiments, a quadrupole assembly according to the present teachings can additionally include one or more auxiliary electrodes to which the voltage pulse can be applied for radial excitation of the ions within the quadrupole. By way of example, FIGS. 4A and 4B schematically depict another exemplary quadrupole assembly 420, which includes a quadrupole rod set 422 comprising four rods 422*a-d* (only two if which are seen in FIG. 4A). The rods 422*a-d* function similarly as the quadrupole rod set 122 discussed above with reference to FIG. 2 (e.g., they generate a radially-confining field via RF signals applied thereto (power supply not shown)), but differ in that a plurality of auxiliary electrodes 440*a,b* are instead electrically coupled to the pulsed voltage source 408*c* for generating the broadband radial excitation of the ions within the quadrupole rod set 422. As shown, the auxiliary electrodes 440*a,b* also extend along the central axis (Z) and are interspersed between the quadrupole rods such that the auxiliary electrodes 440*a,b* are disposed on opposed sides of the central axis (Z) from one another. In this embodiment, the auxiliary electrodes 440*a,b* have similar lengths as the quadrupole rods 422*a-d*, though in other embodiments they can have different lengths (e.g., shorter). It will also be appreciated that though auxiliary electrodes 440*a,b* are depicted as rods having a circular cross-section that is smaller than the rods 422*a-d*, the electrodes 440*a,b* can have a variety of shapes and sizes. By way of example, in this embodiment, a pulsed voltage source 408*c* can apply a dipolar voltage pulse to the electrodes 440*a,b* (e.g., a positive voltage to the electrode 440*a* and a negative voltage to the electrode 440*b*). Similar to the quadrupole assembly 120 discussed above with reference to FIGS. 2A-B, the voltage pulse can cause radial excitation of at least some of the ions passing through the quadrupole such that the interaction of the radially-excited ions with the fringing fields in proximity of the output end of the quadrupole can convert the radial oscillations to axial oscillations, which can be detected by a detector (not shown). Likewise, a controller and various analysis modules such as those discussed above can operate on the time-varying ion signal generated as a result of the detection of the axially oscillating ions to generate a frequency domain signal and determine a fill time of an ion trap based on a determination of the ion beam composition.

The following examples are provided for further elucidation of various aspects of the present teachings, and are not intended to necessarily provide the optimal ways of practicing the present teachings or the optimal results that can be obtained.

EXAMPLES

A 4000 QTRAP® (Sciex) mass spectrometer was modified to incorporate a quadrupole assembly according to the present teachings by coupling opposed quadrupole rods of Q3 (in the position of quadrupole assembly 120 of FIG. 1) to a pulsed voltage source capable of providing a dipolar excitation signal to the opposed quadrupole rods. Ions were generated from a sample containing 0.17 pmol/μL reserpine solution by a nebulizer-assisted electrospray ion source (not shown) and are transmitted through a collision focusing ion guide (e.g., Q0 operating at a pressure of about $8\times10^{-3}$ Torr), mass filter Q1 (operating in RF/DC mass filter mode to select m/z 609 reserpine ions), collision cell q2 (operating in RF-only transmission mode) and the modified Q3 (operating at $3.5\times10^{-4}$ Torr). The drive RF frequency for the quadrupole rod set of modified Q3 was 1.8 MHz and the modified Q3 RF voltage was fixed at 640 $V_{0\text{-}peak}$, corresponding to a q value of 0.174 for the m/z 690 ion. Excitation of ions as they pass through the quadrupole assembly was provided by amplification of a square pulse generated by an Agilent 33220A function generator applied in a dipolar manner to two opposed rods of the quadrupole. Dipolar pulses were applied at 30 V after amplification and for a duration of 750 ns.

Figure 5A:
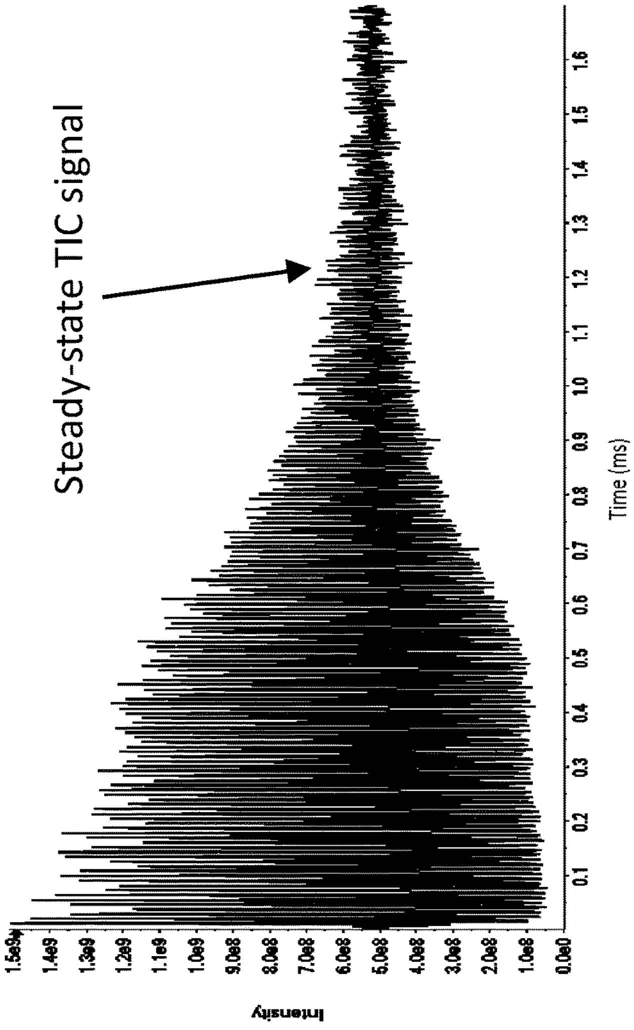
FIG. 5A depicts a time-varying ion signal obtained using a prototype quadrupole assembly in accordance with various aspects of applicant's teachings.
Figure 5B:
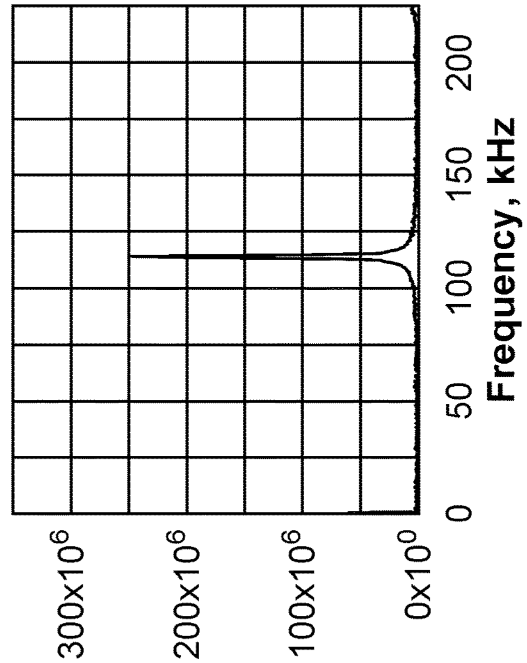
FIG. 5B is a Fourier transform of the oscillatory ion signal shown in FIG. 5A.

An example of the oscillatory signal that results at the detector is shown in FIG. 5A, which demonstrates the increase in the signal from a steady-state level of a Q1 mass-selected beam of m/z 609 from the 0.17 pmol/μL reserpine solution. The oscillatory signal lasts for approximately 1 ms, which reflects the increase in signal due to the 5 microsecond dipolar excitation pulse. When this data file was put through a FFT program (DPlot Version 2.2.1.1, HydeSoft Computing, USA), the frequency spectrum shown in FIG. 5B results. The main peak is located at a frequency of 114.1 kHz, which is very close to the calculated secular frequency of 113.7 kHz calculated for an ion at m/z of 609.28 under the stated quadrupole conditions. In accordance with the present teachings, the ion beam composition can thus be determined from the intensity at the secular frequency corresponding to the reserpine ion and can be utilized to determine an optimum fill time (e.g., if Q1, q2, or Q3 were to be subsequently operated in trapping mode for this particular ion).

Since this modified Q3 quadrupole assembly operates on a continuous ion beam, once the oscillatory signal has died away, another excitation pulse can be triggered and another oscillatory signal acquired. For signals that last about 1 ms, approximately 1000 such traces can be acquired, or rather, data can be acquired at a 1 kHz acquisition rate. While this example is shown with Q1 mass-selected ions of a single m/z 609, substantially all ions of various m/z passing through the quadrupole assembly are excited and detected at their secular frequencies (utilizing the Fourier transform allows such complicated time-varying signals to resolve the contribution of the various ions) such that a full mass spectrum can be recorded for every excitation pulse with very few ions wasted. Thus, methods and systems incorporating quadrupole assemblies in accordance with various aspects of the present teachings are both rapid and sensitive, without trapping and/or scanning to interrogate various m/z to determine the ion beam composition for determining optimum fill times.

Those having ordinary skill in the art will appreciate that various changes can be made to the above embodiments without departing from the scope of the invention. Further, one of ordinary skill in the art would understand that the features of one embodiment can be combined with those of another.

What is claimed is:

1. A method of performing mass analysis in a mass spectrometer including an ion trap, the method comprising:

passing an ion beam comprising a plurality of ions through a quadrupole assembly having a quadrupole rod set extending from an input end for receiving the ions to an output end through which ions exit the quadrupole rod set, applying at least one RF voltage to each of the rods of the quadrupole rod set so as to generate a field for radial confinement of the ions as they pass therethrough, while applying said at least one RF voltage to each of the rods, applying a voltage pulse across the quadrupole assembly so as to excite radial oscillations of at least a portion of the ions at secular frequencies thereof, wherein fringing fields in proximity to said output end convert said radial oscillations of at least a portion of said excited ions into axial oscillations as said excited ions exit the quadrupole rod set, detecting ions of various m/z ratios among said axially oscillating ions exiting the quadrupole rod set to generate a time-varying signal, obtaining a Fourier transform of said time-varying signal so as to generate a frequency-domain signal containing ion beam composition information, said ion beam composition information comprising intensities of said ions of various m/z ratios, and determining a fill time of the ion trap based on the intensity of one or more ions of a selected range of m/z ratios among said ions of various m/z ratios or the intensity of one or more ions of a selected particular m/z ratio among said ions of various m/z ratios.

2. The method of claim 1, wherein the quadrupole rod set comprises a first pair of rods and a second pair of rods extending along a central longitudinal axis from the input end to the output end, wherein the rods of the quadrupole rod set are spaced apart from the central longitudinal axis such that the rods of each pair are disposed on opposed sides of the central longitudinal axis.

3. The method of claim 2, wherein applying the voltage pulse across the quadrupole assembly comprises applying the voltage pulse across the rods of one of the first and second pairs of the quadrupole rod set.

4. The method of claim 2, wherein the quadrupole assembly further comprises a pair of auxiliary electrodes extending along the central longitudinal axis on opposed sides thereof, wherein each of the auxiliary electrodes is interposed between a single rod of the first pair of rods and a single rod of the second pair of rods, and wherein applying the voltage pulse across the quadrupole assembly comprises applying the voltage pulse across the auxiliary electrodes.

5. The method of claim 1, wherein the step of passing an ion beam through the quadrupole assembly is performed without trapping the ions therein.

6. The method of claim 1, further comprising filling the ion trap for the fill time while operating the ion trap in trapping mode.

7. The method of claim 6, further comprising determining the analytical spectrum from ions trapped in the ion trap.

8. The method of claim 1, wherein the ion beam composition information further comprises intensity of the ion beam.

9. The method of claim 8, wherein determining the fill time of the ion trap is further based on the ion beam intensity.

10. The method of claim 8, wherein the fill time of the ion trap is based on the intensity of said one or more ions of the selected particular m/z ratio, the method further comprising preferentially filling the ion trap for the fill time with said one or more ions of the selected particular m/z ratio.

11. The method of claim 10, wherein a mass analyzer disposed between an ion source and the ion trap is configured to prevent transmission of ions that are not said one or more ions of the selected particular m/z ratio.

12. A mass spectrometer system, comprising:

an ion source for generating an ion beam comprising a plurality of ions;

an ion trap;

a quadrupole assembly having a quadrupole rod set extending from an input end for receiving the ions to an output end through which ions exit the quadrupole rod set;

one or more power sources configured to provide i) at least one RF voltage to each of the rods of the quadrupole rod set so as to generate a field for radial confinement of the ions as they pass therethrough, and ii) a voltage pulse across the quadrupole assembly so as to excite radial oscillations of at least a portion of the ions at secular frequencies thereof, wherein fringing fields in proximity to said output end convert said radial oscillations of at least a portion of said excited ions into axial oscillations as said excited ions exit the quadrupole rod set;

a detector for detecting ions of various m/z ratios among said axially oscillating ions exiting the quadrupole rod set so as to generate a time-varying signal; and a controller comprising one or more analysis modules configured to:

obtain a Fourier transform of said time-varying signal so as to generate a frequency-domain signal containing ion beam composition information, said ion beam composition information comprising intensities of said ions of various m/z ratios, and determine a fill time of the ion trap based on said the intensity of one or more ions of a selected range of m/z ratios among said ions of various m/z ratios or the intensity of one or more ions of a selected particular m/z ratio among said ions of various m/z ratios.

13. The system of claim 12, wherein said quadrupole rod set comprises a first pair of rods and a second pair of rods extending along a central longitudinal axis from the input end to the output end, wherein the rods of the quadrupole rod set are spaced apart from the central longitudinal axis such that the rods of each pair are disposed on opposed sides of the central longitudinal axis.

14. The system of claim 13, wherein the voltage pulse is applied across the rods of one of the first and second pairs of the quadrupole rod set.

15. The system of claim 13, further comprising a pair of auxiliary electrodes extending along the central longitudinal axis on opposed sides thereof, wherein each of the auxiliary electrodes is interposed between a single rod of the first pair of rods and a single rod of the second pair of rods, and wherein the voltage pulse is applied across the auxiliary electrodes.

16. The system of claim 12, wherein said one or more power sources are further configured to provide RF and/or DC signals to the ion trap so as to fill the ion trap for the fill time, and wherein the analysis module is operable to determine the analytical spectrum resulting from said ions trapped in the ion trap.

17. The system of claim 16, wherein the ion beam composition information further comprises intensity of the ion beam.

18. The system of claim 16, wherein the ion beam composition information comprises the intensity of said one or more ions of the selected particular m/z ratio, wherein said one or more power sources are further configured to provide RF and/or DC signals to a mass analyzer disposed between the ion source and the ion trap configured to prevent transmission of ions that are not said one or more ions of the selected particular m/z ratio.

19. The system of claim 16, wherein the controller is operable to automatically adjust the fill time such that the number of ions trapped in the ion trap does not exceed about 10,000 ions.

20. The system of claim 12, wherein said voltage pulse has a duration in a range of about 10 ns to about 1 millisecond.

* * * * *